H. W. HEALE & E. D. GOWAN.
Cock or Valve.
No. 159,924. Patented Feb. 16, 1875.
FIG: 3. FIG: 4.
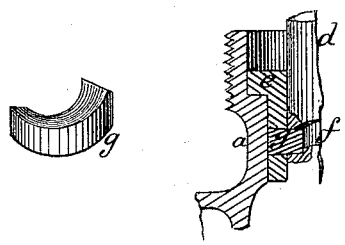 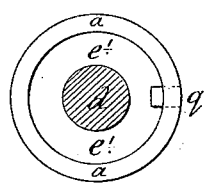
FIG: 1. FIG: 2.
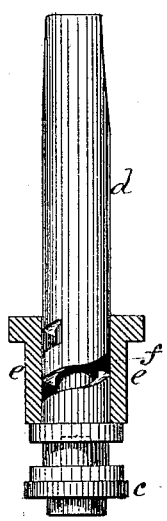 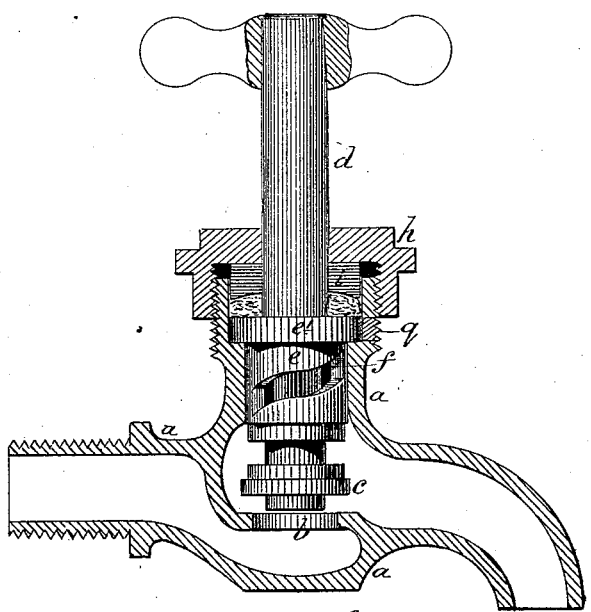
FIG: 5.
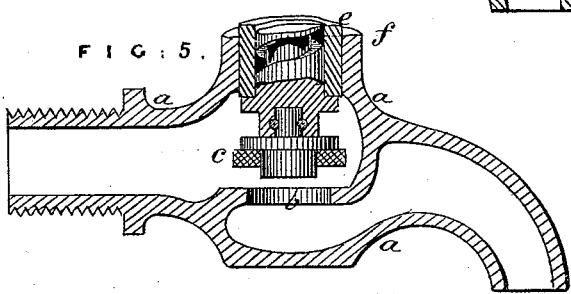
WITNESSES: INVENTORS:
William Keen Henry William Heale
William Price Edmund David Gowan
THE GRAPHIC CO. PHOTO-LITH. 39 & 41 PARK PLACE, N.Y.

UNITED STATES PATENT OFFICE.

HENRY W. HEALE AND EMILIUS D. GOWAN, OF HOLLOWAY, ENGLAND.

IMPROVEMENT IN COCKS OR VALVES.

Specification forming part of Letters Patent No. 159,924, dated February 16, 1875; application filed November 7, 1874.

*To all whom it may concern:*

Be it known that we, HENRY WILLIAM HEALE and EMILIUS DAVID GOWAN, both of Holloway, in the county of Middlesex, England, have invented certain Improvements in the Construction of Cocks or Valves, of which the following is a specification:

The invention relates to certain improvements in the construction of cocks or valves to be applied to steam-boilers, engines, or to other vessels or capacities containing fluids, gases, or vapors under pressure, the object being to form a perfect stop for high-pressure steam, and to obviate the results caused by expansion of ordinary metal cocks by the action of heat, such as the leakage or escape of steam or fluids, and also to prevent undue strain bearing on the moving parts of the valve, which, in action, are simple and effective, and not liable to derangement or locking from disuse.

The improvements relate more particularly to the spindle of the valve and the parts connected therewith; and consist in forming on the spindle a screw-recess of quick pitch and a corresponding recess in the bush, the spindle being operated by means of a key, inserted in and protruding through the recess formed in the bush, and fitting the corresponding recess of the spindle, the bush being prevented from revolving with the spindle by keying it to the barrel.

But that our invention may be fully understood, we will describe the same in detail by aid of the accompanying drawings.

Figure 1 represents the improved construction of valve-spindle and bush, (in section,) put together and ready for being placed in their seating in the barrel of the tap. Fig. 2 represents the spindle and bush in their seating in the cock or valve. Fig. 3 represents the key-piece fitting the recess in the bush shown in Fig. 2, in which it forms a fixed segmental thread for the screw-groove of the spindle shown in Fig. 1 to slide upon; and Fig. 4 represents a plan section of the spindle through the line $x\ x$, showing the method of securing the bush in position when inserted in the barrel of the cock or valve.

In these figures, $a\ a$ is the shell and barrel of the cock or valve, provided internally with a valve-seating, $b$, the thoroughfare leading to which from the source of pressure may be arranged so as to allow the steam or fluid to flow through the valve-aperture from below to the outlet, as in Fig. 2, or from above, as in Fig. 5, the passage being opened or closed by the valve $c$ through the medium of the valve-spindle $d$ and key-bush $e$, the construction and action of which may be thus described:

The valve or stop $c$ forms the lower termination of the valve-spindle $d$. This spindle, on a portion of its length, is provided with a screw-recess, $f$, having a quick pitch, which said recess is entirely surrounded by the bush $e$, which accurately fits the bore of the barrel $a$, in which it is prevented from turning by the key-piece $q$. The bore of the bush $e$ corresponds in diameter to that of the valve-spindle $d$, and is provided with one or more key-pieces, $g$, let therein, so as to protrude inside and fit a segmental portion of the screw-groove in the spindle $d$. The bush $e$, containing the spindle, is then let into the socket of the tap, as seen in Fig. 2, so as to rest with its collar $e'$ on the lower surface of the gland. When in this position, and the valve $c$ is resting on the valve-seating, so as to close the same, the gland-cap $h$ is screwed down, so as to press upon the loose ring and packing $i$, at which time the cock or valve is in a condition for use.

It will now be understood that when a partial turn is given to the valve-spindle $d$ the screw-recess formed in the same will slide on the fixed segmental key-piece $g$ secured to the bush $e$, and so raise the valve from its seating, the action of which opens the valve and allows the steam or fluid to escape. A reverse turn to the spindle closes the valve.

In conclusion, we would remark that, although we have shown, as an example, the application of our improvements to one class of cocks or valves only, they are equally applicable to cocks or valves of all descriptions employed for retaining steam, gases, or fluids under pressure. Therefore,

What we claim is—

In cocks or valves for retaining steam, gas, or fluids under pressure, the combination of the valve-spindle $d$, provided with a screw-recess, $f$, with the bush $e$, having a corresponding screw-recess, and actuating the shut-off, the key-piece $g$, and the key $q$, arranged and operating substantially as described.

HENRY WILLIAM HEALE.
EMILIUS DAVID GOWAN.

Witnesses:
WILLIAM KEEN,
WILLIAM PRICE.